(12) United States Patent
Steinberg et al.

(10) Patent No.: US 6,392,714 B1
(45) Date of Patent: May 21, 2002

(54) COLOR TELEVISION SIGNAL PROCESSING

(75) Inventors: Victor Steinberg, Petersfield; James Attew, Liss, both of (GB)

(73) Assignee: Snell & Wilcox Limited, Waterlooville (GB)

( * ) Notice: Subject to any disclaimer, the term of this patent is extended or adjusted under 35 U.S.C. 154(b) by 0 days.

(21) Appl. No.: 08/090,023

(22) PCT Filed: Nov. 16, 1992

(86) PCT No.: PCT/GB92/02120

§ 371 Date: Dec. 13, 1993

§ 102(e) Date: Dec. 13, 1993

(87) PCT Pub. No.: WO93/10641

PCT Pub. Date: May 27, 1993

(30) Foreign Application Priority Data

Nov. 15, 1991 (GB) ................................. 9124333
Mar. 30, 1992 (GB) ................................. 9206885

(51) Int. Cl.$^7$ ................................. H04N 7/98
(52) U.S. Cl. ........................ 348/666; 348/665
(58) Field of Search ................ 348/666, 663, 348/665, 667, 668; 358/31; H04N 7/98

(56) References Cited

U.S. PATENT DOCUMENTS

| 4,635,104 | A | * | 1/1987 | Housdörfer | 348/663 |
| 4,809,060 | A | * | 2/1989 | Saeki | 348/668 |
| 4,868,650 | A | * | 9/1989 | Weckenbrock | 348/701 |
| 5,173,768 | A | * | 12/1992 | Sowig et al. | 348/665 |
| 5,367,342 | A | * | 11/1994 | Bang | 348/666 |

FOREIGN PATENT DOCUMENTS

| JP | 0129892 | * | 8/1983 | 358/31 |
| JP | 61-174894 | * | 8/1986 | H04N/9/78 |
| JP | 63-296592 | * | 12/1988 | H04N/9/78 |
| JP | 2-71692 | * | 3/1990 | H04N/9/78 |
| JP | 2-148906 | * | 6/1990 | 358/31 |

\* cited by examiner

*Primary Examiner*—David E. Harvey
(74) *Attorney, Agent, or Firm*—Fish & Neave; Jeffrey H. Ingerman

(57) ABSTRACT

A color television decoder or other signal processor has a gate controlling the passage of a notch filtered chrominance signal. A filter circuit produces a further chrominance signal which serves as the control signal for the gate.

23 Claims, 8 Drawing Sheets

COLOR TELEVISION SIGNAL PROCESSING

This invention relates to the processing of colour television signals and is particularly concerned with the separation within an encoded television signal, of luminance and chrominance information.

An encoded television signal is made up of a luminance signal (Y), and colour difference signals (U, V) which define hue and saturation. In both NTSC and PAL television systems, the two colour difference signals are each used to amplitude modulate a colour sub-carrier using quadrature modulation. The resulting signal is referred to as the chrominance signal. The colour sub-carrier frequency necessarily lies within the bandwidth of the luminance signal and it is the function of a decoder circuit to decode the luminance and chrominance information avoiding, so far as possible, crosstalk.

Decoder circuits are used in a variety of applications. The decoder circuit within a television receiver is perhaps the simplest application since the decoded signal is used directly for the television display. In other applications, a decoded signal undergoes further processing and may be subsequently re-encoded. In applications of this sort, the demands placed upon the decoder circuit are of course higher.

Different television standards, principally PAL and NTSC, employ different techniques for the encoding of luminance and chrominance information. In PAL, for example, the sub-carrier used for one of the colour difference signals is inverted on alternate lines at the television picture. The sub-carrier frequency is related to the television line scanning frequency but is off-set from an integral multiple of line frequency by one quarter of line frequency. In NTSC, the off-set is one half of the line frequency. Because of these, and other differences, separate PAL and NTSC encoders and decoders are developed. This specification will concentrate on PAL but it will be recognised that there are parallels throughout in the encoding and decoding of PAL, NTSC and—indeed—other standards.

A rudimentary PAL decoder provides a luminance signal by the use of a notch or band stop filter designed to suppress the colour sub-carrier frequency. Similarly, a band pass filter can provide a chrominance signal. Chrominance information is centered at 4.43 MHz but may be spread over the range 3.3 to 5.5 MHz. It will be apparent that the simple use of a notch filter will attenuate luminance information at or near 4.43 MHz, resulting in a loss of horizontal resolution. Also, chrominance information away from 4.43 MHz may be attenuated only partially and will thus be misinterpreted in subsequent circuitry as luminance information. Nonetheless, the use of a notch filter has the merit of simplicity and cheapness.

Because there is a well defined relationship between the colour difference signals on alternating lines, it is possible to derive a filter arrangement, typically utilising two line delays, to produce a filtered chrominance signal. Such circuits are commonly referred to as comb filters and a wide variety of proposals have been made for comb filters suited to varying applications.

A comb filter can in theory be designed to remove all chrominance information in the special case where there is no change, line by line, in the luminance or chrominance signals. In most practical situations, however, there will be small amounts of cross-talk. Depending upon the environment in which the encoder is used, the design can be optimised to reduce the perceived effects of these errors.

In one prior proposal, a measurement is made of the degree to which the luminance and chrominance information departs from the assumed ideal of constancy and, where a threshold amount of difference is exceeded, the comb filter is disabled and an alternative form of decoder—such as a notch filter—used in its place.

The described line comb filter has, in certain prior proposals, been extended into two and sometimes three dimensions. That is to say appropriate delays can be introduced to permit comparisons between pixels in neighbouring lines, between pixels in the same line and between pixels in succeeding fields. The degree of weighting to be applied to the samples in a one, two or three dimensional filter will be selected to optimise performance. Indeed, in one prior proposal, signals derived from a picture analyser are used dynamically to vary the coefficients in a two dimensional filter.

An inherent difficulty in the use of comb filters, of whatever dimension, is that the phase of signals at various points within the decoder must be carefully controlled. It will be recognised that a very slight phase difference in the subtraction of a composite signal and a comb filtered chrominance signal can lead to significant decoding errors. For this reason, whilst comb filters are able to provide significant improvements in decoding over band stop and band pass filters, there are significant penalties in the complexity of the circuitry and in costs.

It is one object of this invention to provide an improved decoder which offers an improvement in accuracy over band stop and band pass filtering without placing unduly high demands on phase matching.

There are close parallels between encoding and decoding and numerous other processes relating to the separation of luminance and chrominance. This invention is not therefore restricted to decoding.

It is a further object of this invention to provide an improved encoder capable, in specified applications, of providing desired encoder characteristics in a more efficient manner than hitherto.

It is still a further object of this invention to provide an improved luminance filter for use in a variety of applications.

Accordingly, in one aspect the present invention consists in a colour television signal processor for use in the separation of chrominance and luminance signals, comprising an input terminal and an output terminal, first filter means connected with the input terminal for producing a first filtered signal, gate means having a control terminal and adapted for selectively passing the first filtered signal to the output terminal, and second filter means connected with the input terminal for delivering a second filtered signal to the control terminal of the gate means.

Advantageously, the first filter means comprises a band pass filter at the colour sub-carrier frequency.

Preferably, the second filter means comprises a comb filter arrangement.

Suitably, the gate means comprises a first gate having a first control terminal and being connected to receive a positive going component of the first filtered signal, and a second gate having a second control terminal and being connected to receive a negative going component of the first filter signal, the first and second control terminals receiving positive and negative going components, respectively, of the second filtered signal.

In a further aspect the present invention consists in a colour television processor adapted to produce luminance and chrominance signals from a composite television signal, comprising:

a chroma filter circuit adapted to produce from the composite signal a chrominance signal;

signal processing means for generating from said chrominance signal a detected chrominance signal;

band filter means adapted to produce from the composite signal a band filtered chrominance signal;

gate means receiving the band filtered chrominance signal and serving under the control of the detected chrominance signal to pass a gated chrominance signal; and subtraction means for generating a luminance signal through subtraction of the composite television signal and gated chrominance signal.

Suitably, the chroma filter circuit comprises one or more delays and is adapted to produce a comb filtered chrominance signal.

In the decoder according to a preferred form of the present invention a luminance signal is generated by the subtraction from the composite signal of a chrominance signal which is band filleted but which has not been subject to comb filtering. There is accordingly a straightforward and readily maintained exact phase relationship between the signals which are to be subtracted. To deal with the problem that the band filtered signal will often contain spurious luminance signals at or around the colour sub-carrier frequency, the band filtered signal, prior to subtraction from the composite signal, is gated in accordance with the detected chrominance signal. This latter signal is suitably derived from a comb filtering process and is thus capable of distinguishing such spurious luminance information. Since, however, the comb filtered chrominance signal is used to control a gate and is not directly subtracted from the composite signal, slight phase errors in the comb filter are insignificant. Indeed, the output of the comb filter circuit may undergo rectification and/or envelope detection to produce the detected chrominance signal for use in controlling the gate.

This invention will now be described by way of example with reference to the accompanying drawings in which.

Figure 1:
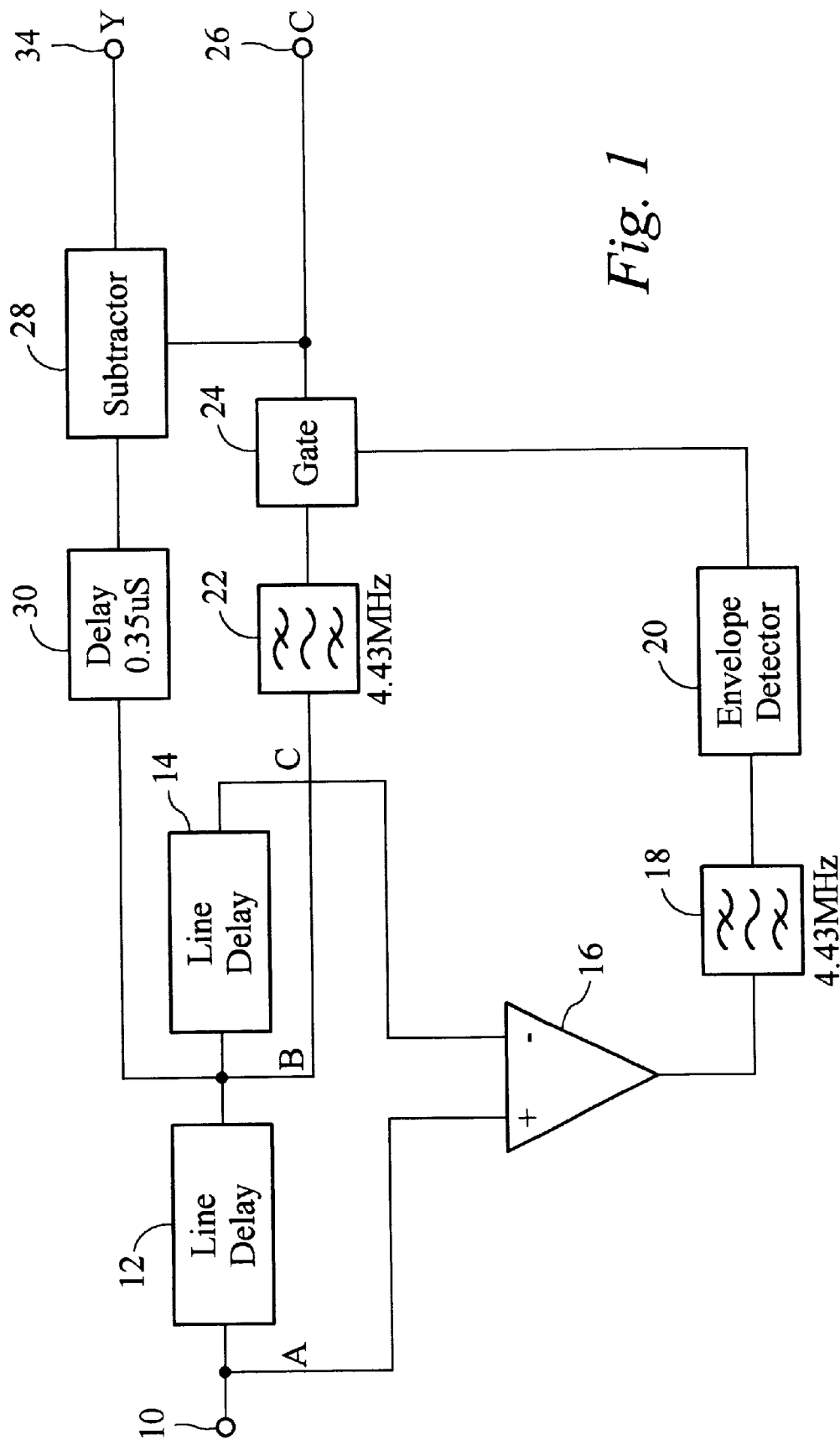
FIG. 1 is a block diagram representation of a PAL colour television decoder according to one embodiment of the present invention.

Referring initially to FIG. 1, a PAL colour television signal at input terminal 10 passes through line delays 12 and 14 producing line delayed signals A, B and C. In a manner which is conventional, signals A and C are combined in subtractor 16 to eliminate luminance. The resulting, combed chrominance signal is taken through a band pass filter 18 centered on the colour sub-carrier frequency and then through an envelope detector 20. The output of envelope detector 20 is a detected chrominance signal which has undergone appropriate low-pass filtering.

A composite signal is taken, conveniently on line B, through a band pass filter 22 centered on the colour sub-carrier frequency. This serves in a manner analogous to the band pass filter of a rudimentary decoder, to attenuate luminance. It is recognised, nonetheless, that the band filtered chrominance signal which is output from the filter 22 will contain some high frequency luminance.

It has been recognised by the present inventors that high frequency luminance at or around the colour sub-carrier frequency will be displaced temporally from true chrominance information. Thus, by passing the band filtered chrominance signal through a gate 24 which is controlled by the detected chrominance signal from envelope detector 20, much of the spurious high frequency luminance can be blocked. The chrominance signal C which is allowed to pass through the gate 24 is made available at terminal 26 and also passes to the inverting terminal of a subtractor 28. The non-inverting input of subtractor 28 receives the composite television signal on line B, through a small delay 30 selected to balance the delay in band pass filter 22 and gate 24. The output of subtractor 28 is a luminance signal Y which is made available at terminal 32.

It is important to note that the inputs to the subtractor 28 have not been comb filtered. It is accordingly a straightforward matter to maintain precise phase relationship between the inverting and non-inverting inputs to produce accurate luminance information at terminal 32.

Figure 2:
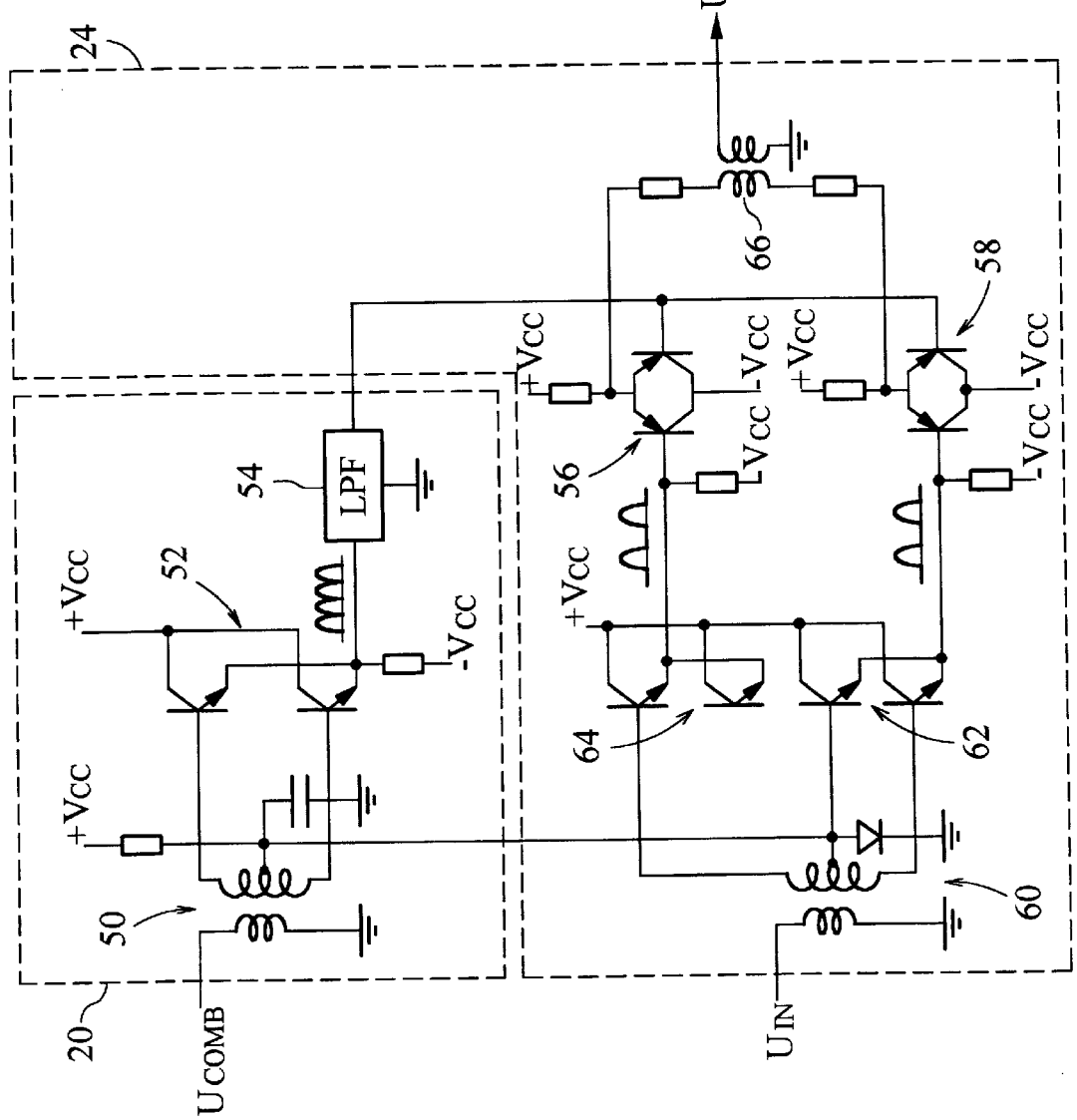
FIG. 2 is a circuit diagram of two components shown in block form in FIG. 1.

Referring now to FIG. 2, there will be described in more detail one preferred form of the components shown in the block form of FIG. 1 at 20 and 24.

The comb filtered chrominance signal U comb is taken through a balancing transformer 50 having a grounded mid tap to a full wave rectifier 52. The rectified signal passes through low-pass filter 54 and is taken to the control input of two long-tailed pair gates 56 and 58, forming part of gate 24.

The band filtered chrominance signal Uin is taken through a balancing transformer 60 having half wave rectifiers 62 and 64 connected between a common mid tap and respective opposite ends of the transformer. The outputs of the half wave rectifiers 62,64—representing positive and negative going portions—respectively, of the Uin signal serve as the signal inputs to the respective long-tailed pair gates 56,58. The signal outputs from these gates are taken to output transformer 66 providing a gated chrominance signal U out.

Figure 3:
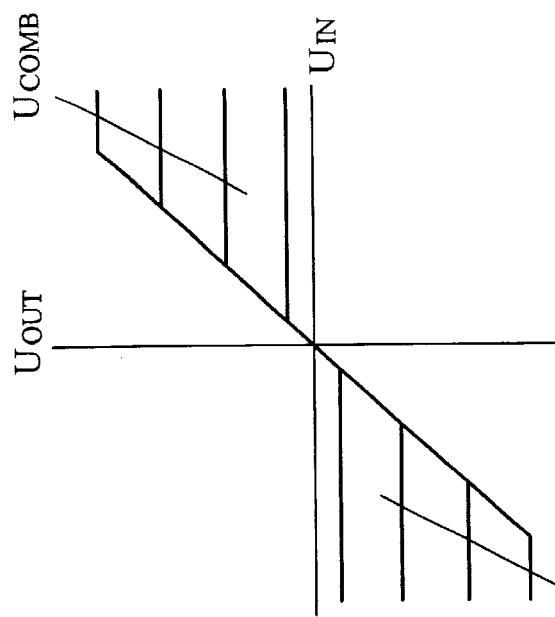
FIG. 3 is a plot illustrating the function of the gate shown in FIGS. 1 and 2.

It will be apparent that the long tailed pair gates 56,58 serve to pass the band filtered chrominance at a level which is determined by the amount of detected comb filtered chrominance. This characteristic is illustrated in FIG. 3.

Figure 4:
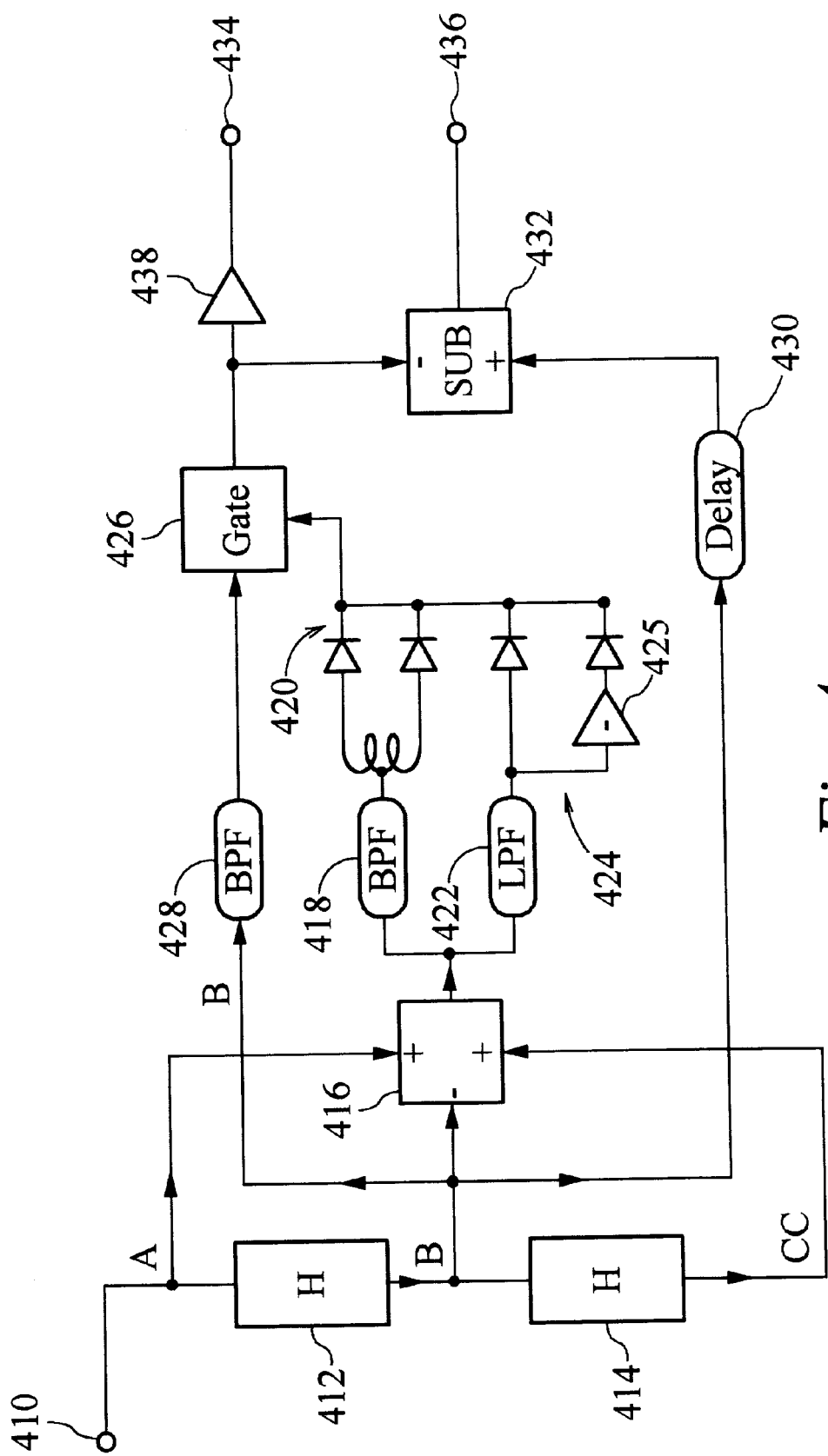
FIG. 4 is a block diagram representation of a PAL colour television decoder according to another embodiment of the present invention.

Referring now to FIG. 4, there will be described an alternative decoder according to this invention.

A PAL colour television signal at input terminal 410 passes through lines delays 412,414 producing line delayed signals A, B and C. In the same manner as in the previous embodiment, these signals are combined in subtractor 416 to eliminate luminance. The resulting, combed chrominance signal is taken through a band pass filter 418 centered on the sub-carrier frequency, to an envelope detector 420. Additionally, the combed chrominance signal is taken through a low-pass filter 422. This forms part of a breakdown detector 424 including inverter 425. This breakdown detector represents the principal distinction between this embodiment and that described above and its function will be described later in more detail.

A composite television signal on line B is taken through a band pass filter 428 which may be similar in design to band pass filter 418. The band pass filter 428 serves as in the previous embodiment to attenuate luminance in the signal passed to the chroma gate 426. In one example, the band pass filter 428 passes 4.433 MHz ±1 MHz.

The output of the chroma gate 426 is combined in subtractor 432 with the composite signal on line B, having passed through delay 430. The delay 430 is a full band width delay which is equivalent to the delay in the band pass filter 428 and the other elements in that chain of circuit. As before, the output from the subtractor is a luminance signal on terminal 436. A chrominance signal can be made available on terminal 434 which receives the output of the chroma gate 426 through a buffer 438.

The function of the breakdown detector 424 is to identify a situation in which chroma filtering will break down. This will occur, for example, where there are significant differences in luminance information between the three lines which form the basis for the chrominance comb. The low-pass filter 422 of course removes all chrominance information and will pass a signal only where there are differences in luminance between the three lines. The function of the inverter is to ensure that the necessary uni-directional control signal is available whether the output of the low-pass filter is positive or negative going. It will be understood that in situations where the comb chrominance signal is known to be unreliable, the chroma gate 426 should be maintained "open" so that a band pass chrominance signal is available at the subtractor 432. Under those circumstances, it is accepted that the band pass filter chrominance signal may include luminance information. This is to be preferred to the alternative where, because there was a breakdown in comb filtering, true chrominance was blocked by the gate 426.

A further embodiment of this invention will now be described with reference to FIGS. 5 and 6.

Figure 5:
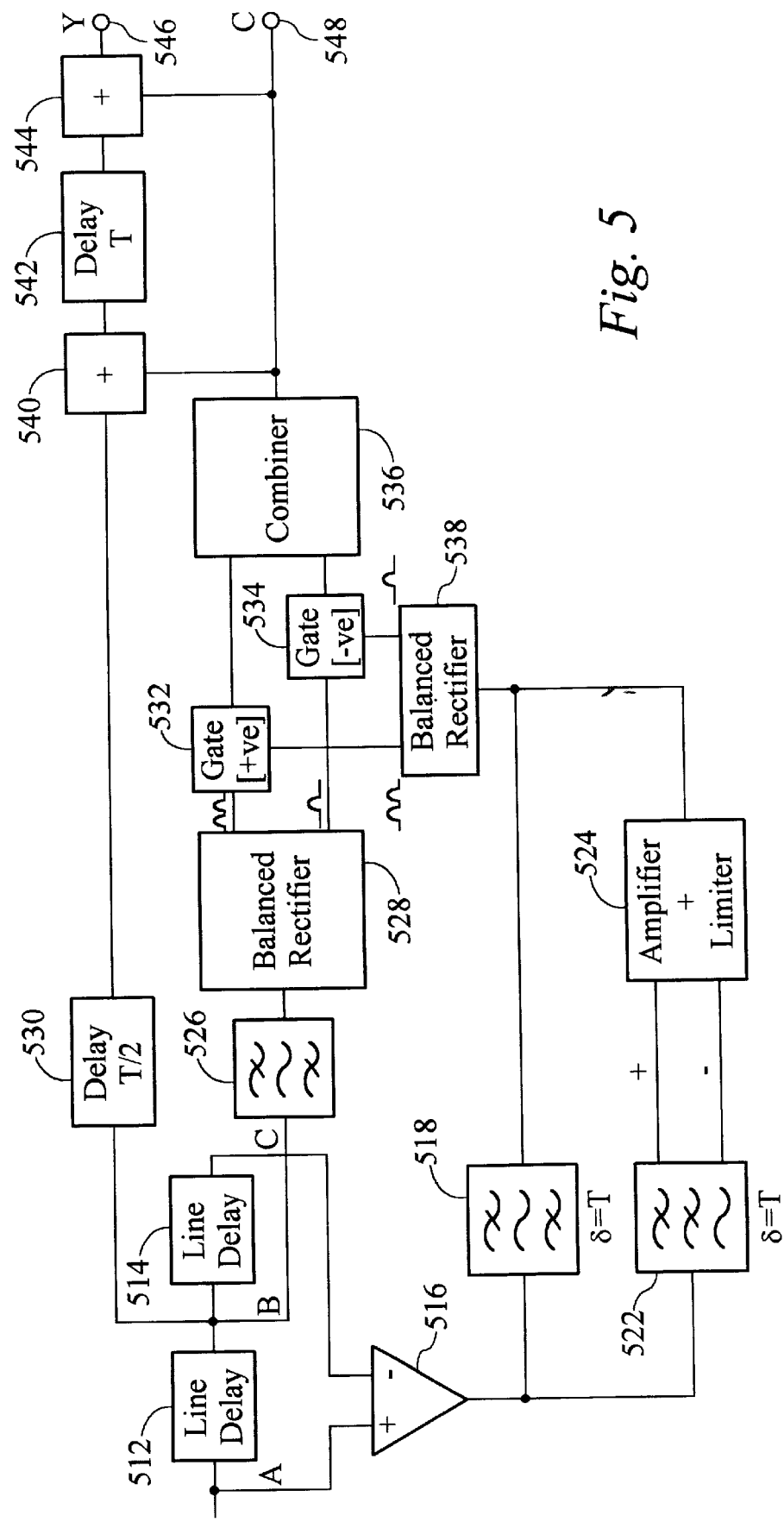
FIG. 5 is a block diagram representation of PAL colour television decoder according to still another embodiment of the present invention.

Turning initially to FIG. 5, a PAL colour television signal at input terminal 510 passes through line delays 512,514, producing line delayed signals A,B and C. In the same manner as in the embodiment of FIG. 1, these signals are combined in subtractor 516 to eliminate luminance. The resulting, combed chrominance signal is taken through band pass filter 518 centered on the sub-carrier frequency. Additionally, the combed chrominance signal is taken through a low pass filter 522. Rectified positive and negative signals from the filter 522 are taken to amplifier and limiter 524.

A composite PAL television signal on line B is taken through a band pass filter 526 which may be similar in design to band pass filter 518. It should be noted that filters 526, 518 and 522 all have d=T. The band pass filter 526 serves as in the previous embodiments to attenuate luminance. The resulting, band-passed chrominance signal is taken to balanced rectifier 528 which produces, on separate output lines, half-wave rectified signals corresponding, respectively, to the positive and negative going cycles of the chrominance signal. These half-wave rectified signals are taken to respective gates 532 and 534 with the outputs of these gates being combined in combiner 536 to produce a gated chrominance signal on terminal 548.

The combed chrominance signal from band pass filter 518 is taken to a balanced rectifier 538 which provides, as control signals for the respective gates 532,534, half-wave rectified signals corresponding with the positive and negative going cycles, respectively, of the combed chrominance signal. Summed within both these gate control signals is the output of amplifier and limiter 524.

The combined effect of the gates 532 and 534 is similar to that of the single gate in the previously described embodiments in that cross colour contained within the output of band pass filter 526 and temporally separated from true chrominance, will be gated out of the chrominance signal on output terminal 548. The advantage and additional feature of this embodiment is that, through separating the band pass chrominance signal into "positive" and "negative" channels and by gating each channel by the "positive" or "negative" component of the combed chrominance signal, it is ensured that the gate is opened for positive-going components of the band pass chrominance signal, only in the presence of positive-going components in the combed chrominance signal. The same applies by analogy to the negative-going components. In this way, the probability of cross colour remaining in the outputted chrominance signal, is further reduced.

As with low pass filter 422 of FIG. 4, the function of low pass filter 522 is to ensure that in the event of comb breakdown, control signals are fed to the gates to pass the band pass filtered chrominance signal.

A further novel feature of the present invention is the manner in which the chrominance signal produced by the gate arrangement is subtracted from the composite TV signal to provide a luminance signal on terminal 546. In place of the subtractor, which in the previously described embodiments receives in-phase composite and chrominance signals, the present invention operates through addition of out-of-phase signals. Moreover, that addition is conducted in two separate stages.

Specifically, a composite TV signal, conveniently on line B, is taken through a T/2 delay 530 to an adder 540. The output of this adder 540 is taken through a T delay 542 to a further adder 544. Both adders 540 and 544 receive as the second input, one half of the amplitude of the chrominance signal outputted from the combiner 536. The output of the second adder 544 is taken to the luminance terminal 546.

As more specifically described in British patent application No. 9206886.5 entitled FILTER WITH IMPROVED PULSE RESPONSE and filed on Mar. 30, 1992 in the name of the present applicant, the elimination of the chrominance component in two stages, with carefully controlled phases, has the effect of significantly improving the pulse response of the decoder.

Figure 6:
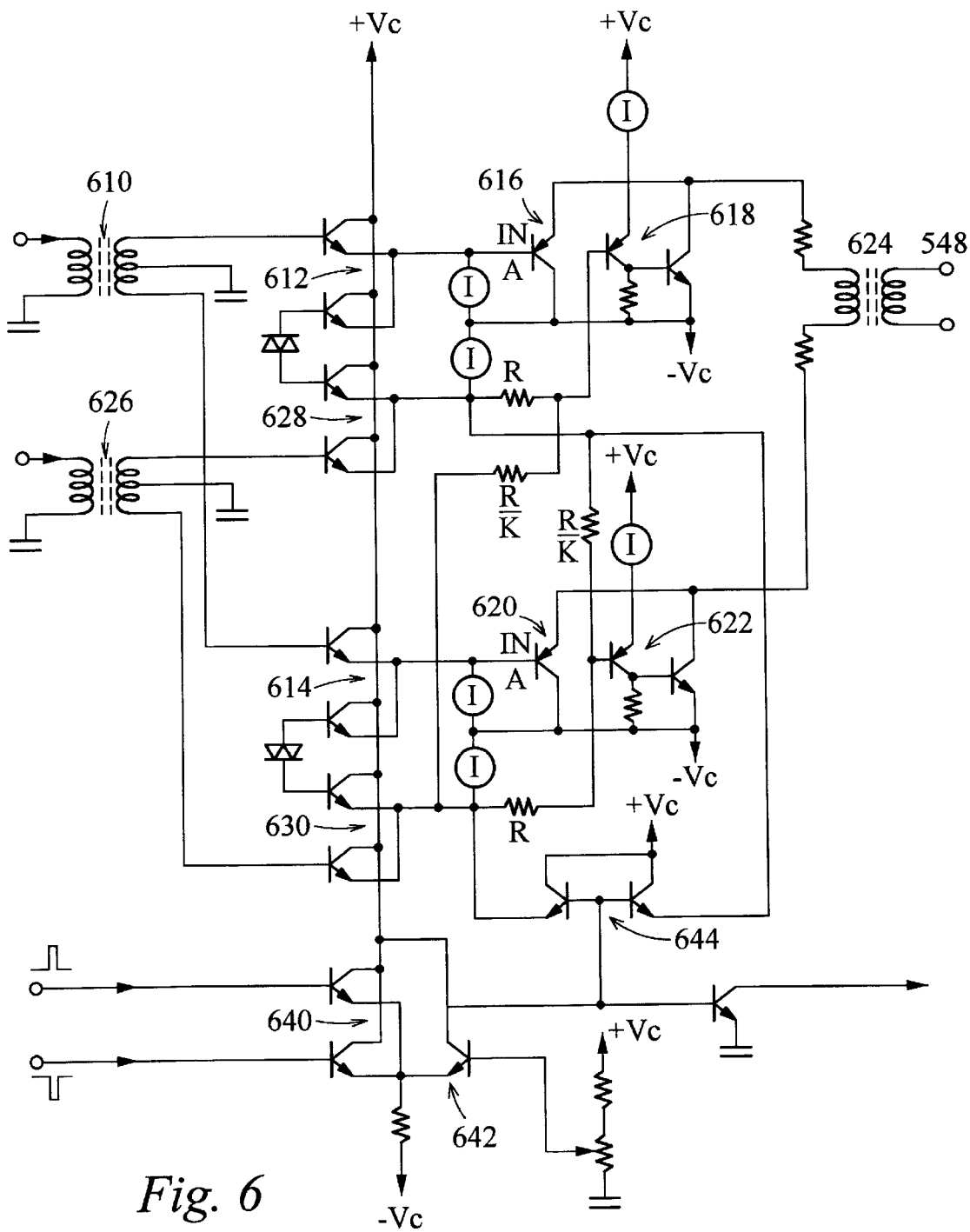
FIG. 6 is a circuit diagram of certain of the components shown in block form in FIG. 5.
Figure 7:
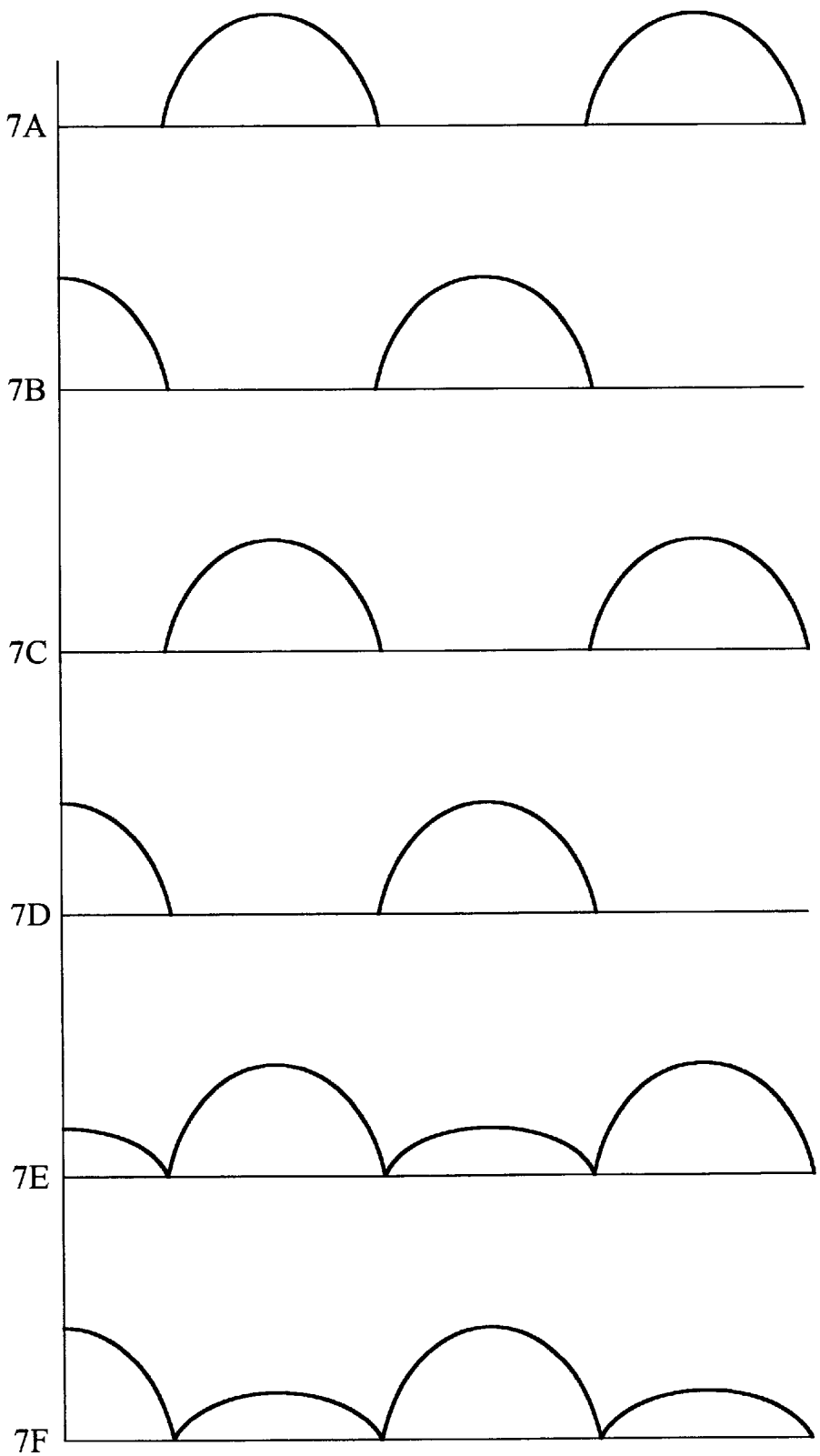
FIG. 7 is a series of plots illustrating signals at various points within the circuit of FIG. 6.

Turning now to FIG. 6, there will be described in more detail the gate arrangement of the embodiment of FIG. 5. Reference will also be had to the signal plots in FIG. 7.

The band pass filtered chrominance signal from band pass filter 526 is fed differentially via transformer 610 to two half-wave rectifiers 612 and 614. The transformer 610 and the rectifier 612,614 can be seen together to represent the balanced rectifier 528 of FIG. 5. The half-wave rectified signal from rectifier 612—corresponding to the positive going cycles of the band pass chrominance signal—is taken to the base of emitter follower 616 driving an NPN and PNP transistor pair 618. This signal is illustrated at line 7A of FIG. 7. Similarly, the output of half-wave rectifier 614, corresponding to the negative going cycles of the band pass chrominance signal, is taken to the base of emitter follower 620 driving an NPN and PNP transistor pair 622. This signal is seen at line 7B of FIG. 7.

It will be recognised that the transistor arrangement 616,618 corresponds with the gate 532 of FIG. 5 and the transistor arrangement 620,622 with the gate 534. The outputs of these respective transistor arrangements are taken through balancing transformer 624, representing the combiner 536 of FIG. 5, to the chrominance terminal 548.

The combed chrominance signal from band pass filter 518 is fed via transformer 626 to two half-wave rectifiers 628 and 630. The output of half-wave rectifier 628, corresponding to the positive going cycles of the combed chrominance signal (and shown in plot 7C), is taken through a resistance R to the input base of transistor pair 618. Similarly, the output of half-wave rectifier 630 (see plot 7D) is taken through a resistance R to the input base of transistor pair 622. It will be recognised that the transformer 626 and the half-wave rectifier 628 and 630 together correspond with the balanced rectifier 538 of FIG. 5.

As so far described, it will be seen that the circuitry performs the gating function described with reference to FIG. 5. That is to say positive going cycles of band pass chrominance will be passed through the combined gate if and to the extent that there simultaneously exists positive going combed chrominance, the same applying to negative going cycles.

In a refinement, a small amount of the opposite phase of the combed chrominance signal is applied to the control of each gate. Thus, the output of half-wave rectifier 628 is connected not only to the input base of transistor pair 618 through resistance R, but also to the input base of transistor pair 622 through resistance R/K. Similarly, the output of half-wave rectifier 630 is connected through resistance R/K with the input base of transistor pair 618. The result of this phase mixing is, as illustrated in plots 7E and 7F of FIG. 7, to allow each of the "positive" and "negative" gates to pass a small amount of the opposite phase. The precise levels of phase mixing are determined by the resistance values R and R/K. The effect of an appropriate small amount of phase mixing is to linearise the gate opening, at low levels of chroma.

Turning now to the components in the circuit of FIG. 6 which correspond with the amplifier and limiter 524 of FIG. 5, non-inverted and inverted combed chrominance signals are taken through a half-wave rectifier arrangement 640 and limiter 642, to a dual emitter follower 644. This drives the input bases of the respective transistor pairs 618 and 622.

In a case where there are significant differences in luminance information between adjacent lines and combed detection of chrominance is likely to break down, low pass filter 522 will produce non-zero signal on either the non-inverted or the inverted output. This, through rectifier 640, limiter 642 and emitter followers 644 will cause a control signal to be applied to each of the transistor pairs 618 and 622, effectively opening the gate arrangement. The output from the limiter 642 is further taken through transistor 646 to provide a clipped, comb break down signal for use in further processing of the video signals.

Whilst this invention has been specifically described in relation to PAL decoders, it is of course applicable to other broadcast standards and indeed may find greater application with NTSC. The invention will find application in SECAM systems with suitable signal processing modifications to take account of the approximately constant amplitude of the SECAM chrominance signal. The modifications will consist mainly in the adjustment of detected chrominance gain and non-linear transformation of the value, conveniently using diodes. Equally importantly, the present invention is not restricted to decoders and will find application in other processes relating to separate luminance and chrominance signals.

One example relates to the use of video recorders and particularly video recorders which run at non-standard speeds. These are used for a variety of purposes including the processing of film originating video material. It will be appreciated that a PAL or other decoder which relies on combing will fail if the input signal is generated by a video recorder running at a non-standard speed and having non-standard line lengths. In one aspect, the present invention will provide a decoder which is less effected by such variations. This is because, as mentioned previously, the chrominance signal which is subtracted from the composite signal is not comb filtered and is not critically dependent in phase upon line length or other variations in the comb filtering process. There are, however, other variations in the signal which are brought about by non-standard VTR speeds, changes in colour information being one example. There would thus be advantage in providing in a VTR recorder which may be used at non-standard speeds, a decoder or separator which was not affected by the line length and other variations in the signal arising from the different speed. A relatively simple encoder or combiner could then be added to create a signal suitable for decoding in conventional manner. It should be noted that the provision in a video recorder of a decoder and re-encoder has been proposed before. However, because of the dependence of the comb filter on line length, this has inevitably reduced the luminance band width. The use of a decoder according to the present invention would permit full luminance band width to be maintained.

Figure 8:
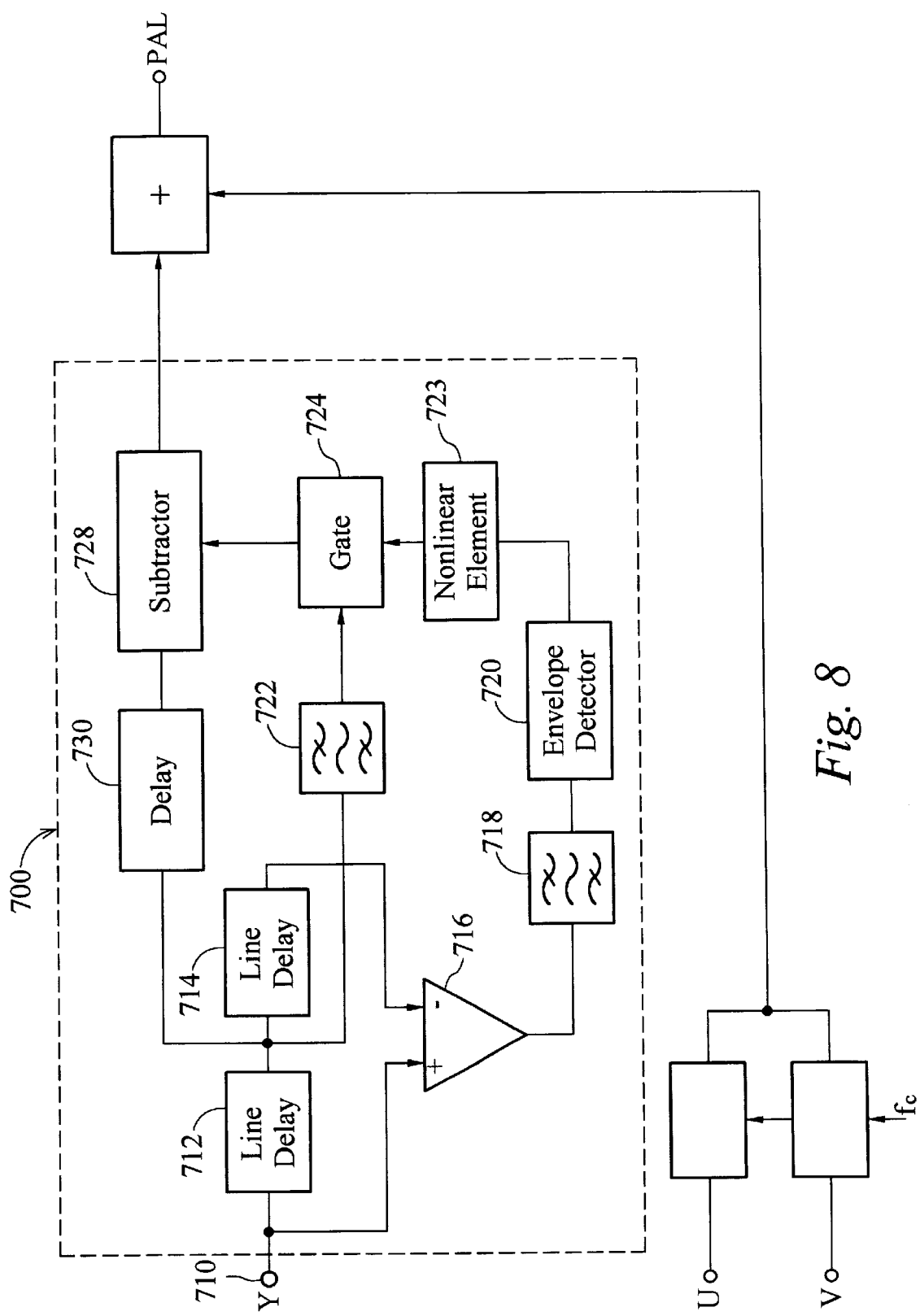
FIG. 8 is a block diagram of a PAL encoder utilising a luminance filter according to this invention.

A further use of a processor according to the present invention is in luminance filtering prior to or as part of an encoding procedure. Referring now to FIG. 8, there is shown a PAL encoder producing a PAL signal from inputs Y, U and V. The circuit is conventional apart from the elements shown in dotted outline 700. These elements, it will be seen, are very similar to those of FIG. 1 and will be described only to the extent that they depart from the arrangement of FIG. 1.

The purpose of the luminance filter 700 is to remove or attenuate those categories of luminance information which are likely in a decoder to be misinterpreted as chrominance. Thus the aim is to attenuate in the luminance signal features such as high frequency diagonal patterns. Vertical and horizontal patterns which although of a frequency within the chrominance band, can be distinguished by a comb filter, should ideally pass unattenuated through the luminance filter. In this way, there is minimal reduction to the luminance band width.

The luminance filter 700 operates on the luminance signal to remove components which might be confused with chrominance in essentially the same manner as the arrangement of FIG. 1 operates on a composite signal to remove true chrominance. An important difference is that it will usually be preferred in the luminance filter to attenuate rather than to remove components which might be confused with chroma. For this reason, there is introduced between the envelope detector 720 and the chroma gate 724 a non-linear device 723. This can be controlled so as to vary the extent to which high frequency diagonal patterns are attenuated in the luminance signal.

Whilst the described encoders employ a simple, one dimensional comb filter, it will be possible, in appropriate applications, to employ more sophisticated comb filters of perhaps two or three dimensions.

Additionally, the control signal applied to the gate may take forms other than the described rectified and low-pass filtered comb signal. A full or half wave rectified signal could be employed without low-pass filtering. A combination of low-pass filtered and unfiltered signals will sometimes be appropriate. To give upper and lower amplitude limits, a combination can be used of two rectified comb signals with different gains.

In a further modification, control signals for the gate can be derived in ways other than conventional comb filters. A simple version of a processor according to this invention could for example be produced using sub-carrier delays or narrow band pass filters. To provide the desired characteristic, combinations of combed and non-combed signals will sometimes be employed. Still further approaches will occur to the skilled man to produce a gate control signal which is an appropriate measure of chrominance and which is in phase with the band pass or other filtered chrominance signal passing through the gate.

It has been previously described how the present invention is able to minimise, in an elegant and relative inexpensive manner, the amount of luminance information which is lost around the sub-carrier frequency. Inevitably, however, there will be some loss of luminance resolution, particularly with diagonal patterns. By the use of an additional feature of the present invention, this slight loss of luminance resolution can be masked so as to improve still further the picture quality.

Figure 9:
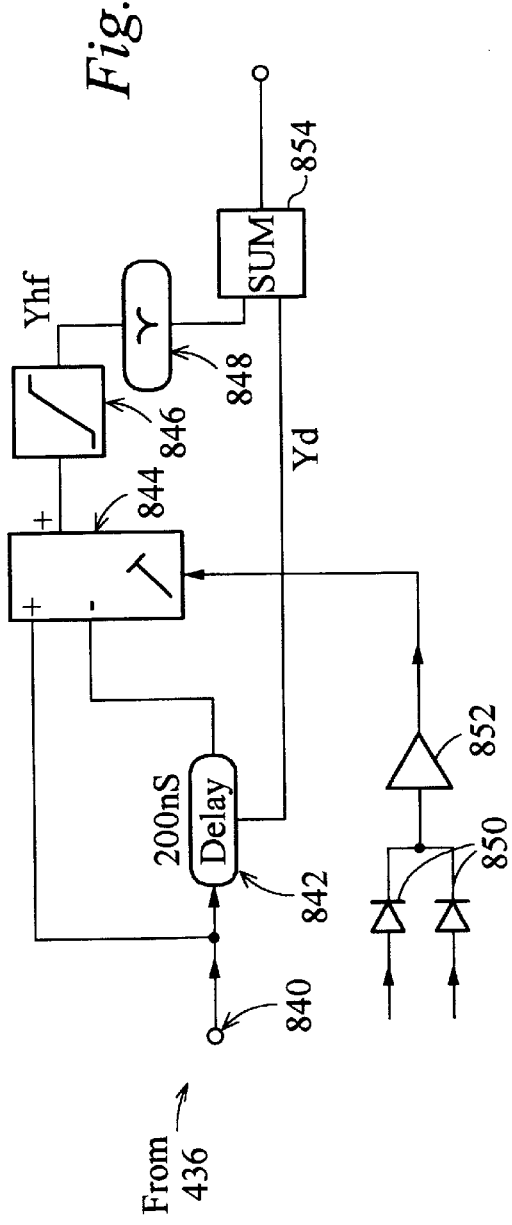
FIGS. 9 and 10 are block diagrams illustrating additional features according to preferred forms of the invention.

Referring now to FIG. 9, there is shown a circuit for dynamic luminance enhancement. A clean luminance signal, for example from terminal 436 of the circuit shown in FIG. 4, is taken on parallel paths to inverting and non-inverting inputs of a combining amplifier 844. A 200 nano-second delay 842 is connected in the inverting path. The combination of delay and combining amplifier thus functions as a transversal filter which outputs only the high frequency luminance component. This can be controlled by varying the delay 842 and in this example the output of the transversal filter peaks at 5 MHz. The high frequency signal is passed through a limiter 846 and then through a sub-carrier notch filter. The purpose of the limiter 846 is to prevent over enhancement whilst the notch filter ensures that there is no enhancement of unwanted sub-carrier signals in the luminance channel. High frequency luminance output from the notch filter 848 is combined in summer 854 with the conventional luminance signal which can conveniently be taken from the mid-point of delay 842.

The gain of the combining amplifier 844—and thereby the amount of the enhanced high frequency luminance which is added—is controlled in accordance with the level of detected chrominance. A combed chrominance signal is taken conveniently from the envelope detector 420 of FIG. 4 through a buffer amplifier 852 to the control input of combining amplifier 844. In this way, it is achieved that when there is a high level of combed chrominance, and thus frequencies at the sub-carrier frequency (whether true chrominance or diagonal luminance) have been removed from the luminance channel, there is an enhancement of high frequency luminance. Where there is no combed chrominance signal, it is known that the luminance signal is passing unaltered in the luminance channel and enhancement is not required.

In terms of perception, the effect of high frequency luminance enhancement is to sharpen edges in, for example, a diagonal pattern. Visually, this tends to compensate for a loss of amplitude in the diagonal pattern.

In producing a high frequency luminance component, it will be recognised that a variety of the arrangements can be employed beyond the described combination of a delay and a combining amplifier. The combination of the dynamic luminance enhancement circuitry and either a decoder or encoder according to the present invention, will be particularly effective. There may be applications, however, where the dynamic luminance enhancement feature is of benefit in other contexts.

Figure 10:
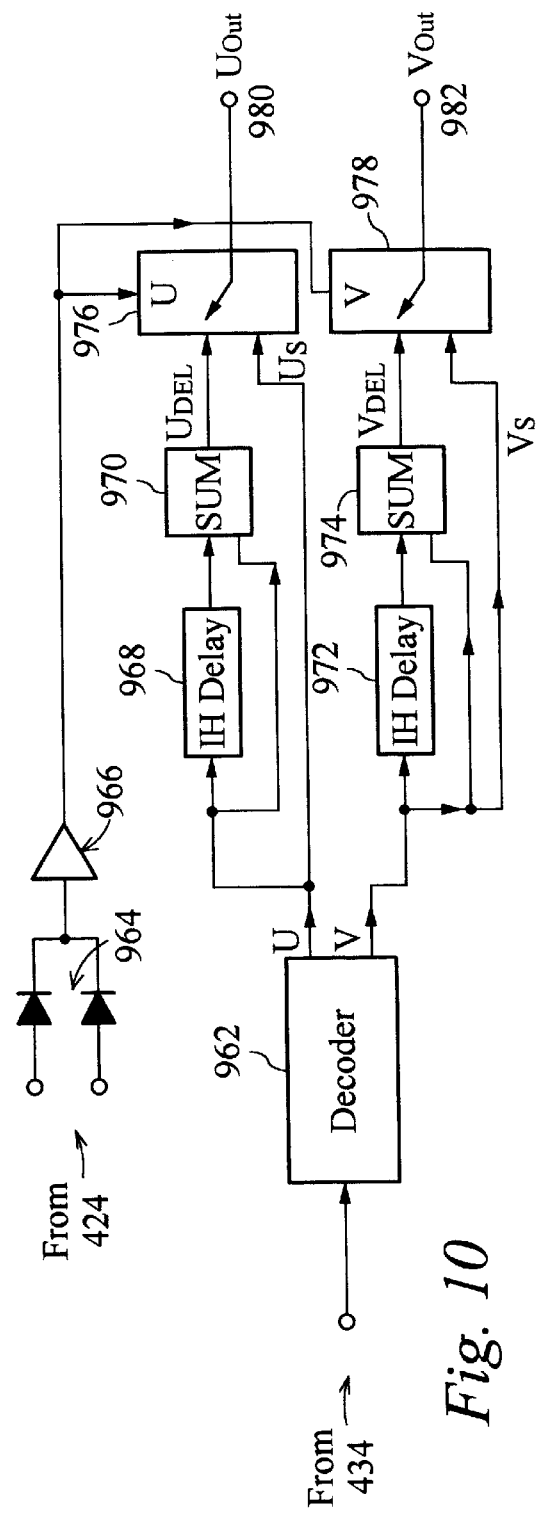

Referring now to FIG. 10, there is illustrated a separate feature which can optionally be employed to improve a decoder according to the present invention.

It has previously been recognised that artefacts can be created in solid blocks of constant colour because of slight errors in PAL decoding. Because the phase alters on alternate lines, a slight frequency error can have the effect in blocks of solid colour of introducing variations in hue between alternate lines of the picture. Such artefacts are known as Hanover bars. It has been recognised that this artefact can be removed by a technique which averages a chrominance signal over two lines. Thus a pattern of alternating light and dark lines is replaced by a block of colour at the mean saturation level. Of course, this effect is achieved only at the cost of a loss in vertical resolution.

In a feature of the present invention, there is dynamic switching between this delay decoding and what might be called simple decoding.

As shown in FIG. 10, a separated chrominance signal, for example from terminal 434 of FIG. 4, is taken to a U/V decoder 962. U and V signals from this decoder are taken on identical paths to respective output terminals 980 and 982. For convenience, only the U channel will be described.

The U signal is taken on two parallel paths to a U switch 976. In one path, what might be termed the simple U signal is taken direct to the switch 976. In the other path, a line delay 968 and a summer 970 produce a delayed U signal which is a two line average. The function of the U switch 976 is to present at the output 980 either the simple or the delayed U signal. The control of the U switch 976 is taken from the breakdown detector 424 of FIG. 4, via a buffer amplifier 966. In this way, when luminance is constant and there is accordingly a risk of Hanover bars appearing as an artefact, the U switch 976 presents the delayed signal. When there is changing luminance information, the simple U signal is employed, so maximising the chrominance band width. It will be understood that the errors which lead to the appearance of artefacts are not removed in this procedure; it is simply that the artefacts are less apparent when there is changing luminance information and it is therefore more important to maintain resolution.

The U switch 976, and the V switch 978 can be replaced by linear mixers which, instead of switching between the simple and delay signals, can produce linear mixes in proportions dependent upon the amplitude of the control signal.

The encoder according to the present invention will find use in a variety of environments. It will offer in television receivers a significantly increased performance without the cost penalty associated with currently available comb filters. More diverse applications will include television studio equipment where signals require to be decoded for processing and subsequent re-encoding; interfacing with satellite broadcasting equipment and video cameras and recorders. In these diverse applications, performance of a decoder is invariably a compromise between the avoidance of cross-talk and the loss of resolution. The novel approach to decoding in the present invention may give increased freedom in the optimisation process.

The decoder according to the present invention, whilst specifically described in relation to PAL, will offer benefits in NTSC and other standards. Also, the encoder will with appropriate modification operate, with analogue signals or sampled, digital signals. Whilst the features of this invention have largely been illustrated with reference to analogue components, digital implementation will be possible.

What is claimed is:

1. A colour television signal processor for use with chrominance and luminance signals, comprising an input terminal and an output terminal; a first filter connected with the input terminal for producing a first filtered signal; a gate having a single input and a control terminal for receiving a control signal; and a second filter connected with the input terminal for delivering a second filtered signal to the control terminal of the gate as a control signal, wherein the gate is adapted to pass the first filtered signal in response to the control signal and is further adapted to variably pass the first filtered signal at a level which is determined by the control signal.

2. A processor according to claim 1, wherein the first filter comprises a band pass filter at the colour sub-carrier frequency.

3. A processor according to claim 1 or claim 2, wherein the second filter comprises a comb filter arrangement.

4. A processor according to claim 1, wherein the first and second filter means are adapted to produce from a composite television signal presented at the input terminal, different measures of chrominance information.

5. A processor according to claim 1, wherein the gate means comprises a first gate having a first control terminal and being connected to receive a positive going component of the first filtered signal, and a second gate having a second control terminal and being connected to receive a negative going component of the first filtered signal, the first and second control terminals receiving positive and negative going components, respectively, of the second filtered signal.

6. A processor according to claim 5, wherein each of the first and the second control terminals is connected to receive a major proportion of one of the positive and negative going components of the second filtered signal and a minor proportion of the other said component.

7. A colour television processor adapted to produce luminance and chrominance signals from a composite television signal, comprising:
   a chroma filter circuit adapted to produce from the composite signal a first chrominance signal;
   a band filter adapted to produce from the composite signal a band filtered chrominance signal;
   a three terminal gate having a single input terminal, an output terminal and a control terminal and receiving the band filtered chrominance signal at said input terminal and serving under control of the first chrominance signal received at the control terminal to pass a gated chrominance signal at said output terminal only if and to the extent that there simultaneously exists a first chrominance signal; and
   subtraction means for generating a luminance signal through subtraction of the composite television signal and gated chrominance signal.

8. A processor according to claim 7, wherein the chroma filter circuit comprises one or more delays and is adapted to produce a comb filtered chrominance signal.

9. A processor according to claim 1 or claim 7, wherein the gate means further receives at a control terminal a comb breakdown signal indicative of large differences in luminance information between adjacent lines.

10. A method of processing a colour video signal comprising the steps of forming first and second signals representative of respective different measures of chrominance which have a substantially constant colour sub-carrier phase relationship and gating the passage of the first signal in dependence upon the instantaneous amplitude of the second signal, wherein the step of gating comprises receiving a single input, being the first signal, and outputting a single output, being a proportion of the first signal.

11. A method according to claim 10, wherein the step of forming said first signal includes a band pass filtering operation.

12. A method according to claim 10 or claim 11, wherein the step of forming said second signal includes a comb filtering operation.

13. A method according to claim 12, wherein the step of forming said second second signal further comprises the step of deriving a comb breakdown signal indicative of large inter-line luminance differences and combining said comb breakdown signal with a comb filtered signal.

14. A method of decoding a composite video signal according to claim 10, comprising the steps of providing the gated second signal as a chrominance signal and subtracting the so provided chrominance signal from the composite signal to provide a luminance signal.

15. A method according to claim 14, further comprising the step of dynamically enhancing a high frequency component of said luminance signal in dependence upon the instantaneous amplitude of said second signal.

16. A colour television signal decoder, comprising an input terminal adapted to receive a composite television signal; an output chrominance terminal; an output luminance terminal; a first filter connected with the input terminal for producing a first filtered chrominance signal; a gate having a single input and having a control terminal for receiving a control signal and adapted for variably passing the first filtered signal to the output chrominance terminal at a level which is determined by the control signal; and a second filter connected with the input terminal for delivering a second filtered chrominance signal to the control terminal of the gate as a control signal; and a subtractor connected to receive the composite signal from said input terminal and a chrominance signal from said output chrominance terminal and adapted to deliver a luminance signal to said output luminance terminal.

17. A decoder according to claim 16, wherein the first filter comprises a band pass filter at the colour sub-carrier frequency.

18. A decoder to claim 16 or claim 17, wherein the second filter comprises a comb filter arrangement.

19. A processor according to claim 4, in which said different measures of chrominance information have a substantially constant colour sub-carrier phase relationship.

20. A processor according to claim 1, wherein the gate is adapted to pass the first filtered signal if and to the extent that there simultaneously exists a control signal.

21. A processor according to claim 1, wherein the gate is adapted to pass positive-going elements of the first filtered signal at a level which is determined by postive-going elements of the control signal and adapted to pass negative-going elements of the first filtered signal at a level which is determined by negative-going elements of the control signal.

22. A method according to claim 10, wherein the first signal is gated so as not to exceed the instantaneous amplitude of the second signal.

23. A colour television signal processor for use with chrominance and luminance signals, comprising an input terminal and an output terminal; a band pass filter connected with the input terminal for producing a band pass filtered signal; a gate having a control terminal for receiving a control signal and adapted for selectively passing the band pass filtered signal to the output terminal at a level which is determined by the control signal; and a comb filter connected with the input terminal for delivering a comb filtered signal to the control terminal of the gate as a control signal.

* * * * *

UNITED STATES PATENT AND TRADEMARK OFFICE
CERTIFICATE OF CORRECTION

PATENT NO. : 6,392,714 B1
DATED : May 21, 2002
INVENTOR(S) : Victor Steinberg et al.

It is certified that error appears in the above-identified patent and that said Letters Patent is hereby corrected as shown below:

Title page,
Item [54], title, "COLOR" should be -- COLOUR --;
Item [57], ABSTRACT,
Line 1, "Color" should be -- Colour --.

Column 3,
Line 17, "filleted" should be -- filtered --.

Column 4,
Line 50, "lines" should be -- line --.

Column 9,
Line 7, "relative" should be -- relatively --.

Column 12,
Line 5, "second" (second occurrence) should be deleted.
Line 49, "postive-going" should be -- positive-going --.

Signed and Sealed this

Twenty-fifth Day of March, 2003

JAMES E. ROGAN
*Director of the United States Patent and Trademark Office*